US012632728B2

(12) United States Patent
Noh et al.

(10) Patent No.: US 12,632,728 B2
(45) Date of Patent: May 19, 2026

(54) ELECTRONIC DEVICE AND METHOD FOR PROVIDING OUTPUT WORDS BASED ON INPUT WORDS

(71) Applicant: NCSOFT CORPORATION, Seongnam-si (KR)

(72) Inventors: Hyungjong Noh, Seongnam-si (KR); Sanghyuk Choi, Seongnam-si (KR); Jeongin Hwang, Seongnam-si (KR)

(73) Assignee: NCSOFT CORPORATION, Seongnam-si (KR)

( * ) Notice: Subject to any disclaimer, the term of this patent is extended or adjusted under 35 U.S.C. 154(b) by 969 days.

(21) Appl. No.: 17/840,729

(22) Filed: Jun. 15, 2022

(65) Prior Publication Data

US 2023/0186076 A1     Jun. 15, 2023

(30) Foreign Application Priority Data

Dec. 15, 2021     (KR) ........................ 10-2021-0179620

(51) Int. Cl.
| | |
|---|---|
| *G06N 3/08* | (2023.01) |
| *G06F 18/211* | (2023.01) |
| *G06N 3/045* | (2023.01) |

(52) U.S. Cl.
CPC .............. *G06N 3/08* (2013.01); *G06F 18/211* (2023.01); *G06N 3/045* (2023.01)

(58) Field of Classification Search
CPC ......... G06N 3/045; G06N 3/08; G06F 18/211
See application file for complete search history.

(56) References Cited

U.S. PATENT DOCUMENTS

| | | | | |
|---|---|---|---|---|
| 9,037,464 B1 * | 5/2015 | Mikolov | ................. | G10L 15/06 704/255 |
| 10,824,819 B2 * | 11/2020 | Cao | ......................... | G06F 40/20 |

(Continued)

FOREIGN PATENT DOCUMENTS

| | | |
|---|---|---|
| JP | 07078166 A | 3/1995 |
| JP | 2018-181343 A | 11/2018 |

(Continued)

OTHER PUBLICATIONS

Iyer, Anantharaman, "A Factorized Recurrent Neural Network based architecture for medium to large vocabulary Language Modelling," 2016 IEEE Tenth International Conference on Semantic Computing, pp. 293-300. (Year: 2016).*
Menon et al., "An Insight into the Relevance of Word Ordering for Text Data Analysis," IEEE Proceedings of the Fourth International Conference on Computing Methodologies and Communication, pp. 207-213. (Year: 2020).*

(Continued)

*Primary Examiner* — Eric J. Bycer
(74) *Attorney, Agent, or Firm* — Sughrue Mion, PLLC

(57)     ABSTRACT
An electronic device according to an embodiment includes a processor configured to obtain a first data set including a plurality of first words, based on a first neural network stored in the memory, obtain from the first data set, a second data set including a first sub data set including first parameters corresponding to each of designated second words and a second sub data set including second parameters corresponding to each of the plurality of first words, and output, based on parameters included in the second data set, one or more third words related to the plurality of first words, and the first neural network is trained based on a first weight factor applied to the first parameters corresponding to each of the second words and a second weight factor applied to the second parameter, using a second neural network. Various other embodiments are possible.

20 Claims, 7 Drawing Sheets

(56) References Cited

U.S. PATENT DOCUMENTS

| 11,003,704 | B2 | | 5/2021 | Paulus | |
| 2010/0332217 | A1 | | 12/2010 | Wintner et al. | |
| 2015/0066496 | A1 | * | 3/2015 | Deoras ................... | G10L 15/16 |
| | | | | | 704/232 |
| 2017/0091169 | A1 | * | 3/2017 | Bellegarda .............. | G10L 15/16 |
| 2022/0172058 | A1 | * | 6/2022 | Dellaferrera ........... | G06N 3/047 |
| 2022/0245343 | A1 | * | 8/2022 | Brun ........................ | G06N 3/08 |

FOREIGN PATENT DOCUMENTS

| KR | 10-2021-0034486 A | 3/2021 |
| KR | 10-2021-0125275 A | 10/2021 |

OTHER PUBLICATIONS

Noh, et al., "Attention-based Unsupervised Style Transfer by Noising Input Sentences", NLP Center Language AI Lab, NCSOFT, 2018, pp. 434-439 (6 pages).

Park, et al., "Text Style Transfer of Non-parallel Data using Transformer and Discriminator", Changwon National University, 2020, pp. 64-68 (5 pages).

Yang, et al., "Unsupervised Text Style Transfer using Language Models as Discriminators", 32nd Conference on Neural Information Processing Systems (NeurIPS), 2018, arXiv:1805.11749v3 [cs.CL] Jan. 29, 2019, pp. 1-14 (14 pages).

Communication dated Feb. 15, 2026 in Korean Application No. 10-2021-0179620.

* cited by examiner

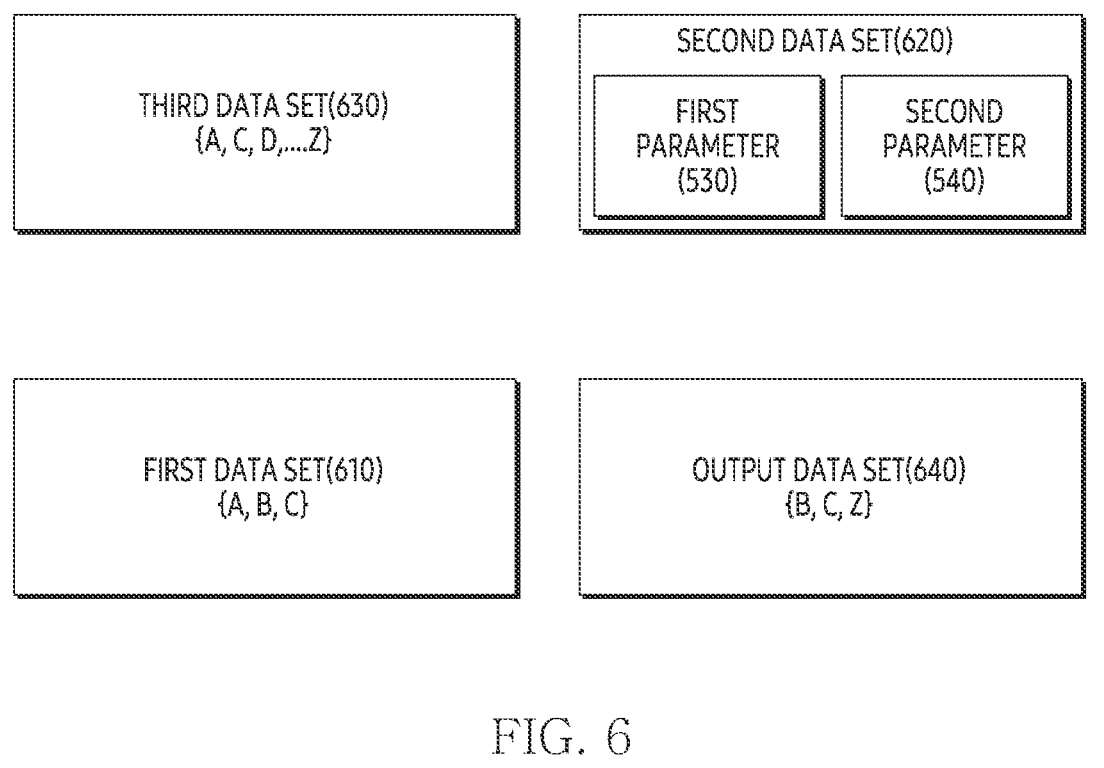

THIRD DATA SET(630)
{A, C, D,....Z}

SECOND DATA SET(620)

FIRST PARAMETER (530)

SECOND PARAMETER (540)

FIRST DATA SET(610)
{A, B, C}

OUTPUT DATA SET(640)
{B, C, Z}

FIG. 6

START

IDENTIFY WHETHER EACH OF PLURALITY OF WORDS IN OUTPUT DATA SET IS COMPRISED IN FIRST DATA SET ~ 701

IDENTIFY WHETHER EACH OF PLURALITY OF WORDS IN OUTPUT DATA SET IS COMPRISED IN THIRD DATA SET ~ 703

LEARN FIRST NEURAL NETWORK THROUGH SECOND NEURAL NETWORK ~ 705

UPDATE WORDS IN OUTPUT DATA SET ~ 707

END

ELECTRONIC DEVICE AND METHOD FOR PROVIDING OUTPUT WORDS BASED ON INPUT WORDS

CROSS-REFERENCE TO RELATED APPLICATION(S)

This application is based on and claims priority under 35 U.S.C. § 119 to Korean Patent Application No. 10-2021-0179620, filed on Dec. 15, 2021, in the Korean Intellectual Property Office, the disclosure of which is incorporated by reference herein their entirety.

BACKGROUND

Technical Field

One or more embodiments of the instant disclosure generally relate to an electronic device and a method for providing output words based on input words.

Description of Related Art

As communication technology develops, various types of service are emerging. The service may be provided through an electronic device owned by different users, such as a smartphone. The service may be related to a hardware and/or software mechanism that imitates human behavior and/or thinking, such as artificial intelligence. The technology related to artificial intelligence may comprise a technology using a neural network that simulates a neural network of an organism.

SUMMARY

When providing a natural language generation service based on a neural network, a method of weighting parameters of a neural network for generating natural language may be required in order to increase accuracy of generating natural language.

Technical problems to be achieved in this document are not limited to those described above, and other technical problems not mentioned herein will be clearly understood by those having ordinary knowledge in the art to which present disclosure belongs, from the following description.

According to various embodiments, an electronic device may comprise a memory storing at least one instruction; and at least one processor operatively coupled to the memory, wherein the processor, when executed by the at least one instruction, may be configured to obtain a first data set including a plurality of first words; obtain, based on a first neural network stored in the memory, from the first data set, a second data set including a first sub data set including first parameters corresponding to each of designated second words and a second sub data set including second parameters corresponding to each of the plurality of first words; and output, in response to obtain the second data set, based on parameters included in the second data set, one or more third words related to the plurality of first words, and wherein the first neural network may be trained based on a first weight factor applied to the first parameters corresponding to each of the second words and a second weight factor applied to the second parameter, using a second neural network distinct from the first neural network.

According to various embodiments, a method of electronic device may comprise obtaining a first data set including a plurality of first words; obtaining, based on a first neural network stored in the memory of the electronic device, from the first data set, a second data set including a first sub data set including first parameters corresponding to each of designated second words and a second sub data set including second parameters corresponding to each of the plurality of first words; and outputting, in response to obtaining the second data set, based on parameters included in the second data set, one or more third words related to the plurality of first words; and wherein the first neural network may be trained based on a first weight factor applied to the first parameters corresponding to each of the second words and a second weight factor applied to the second parameter using a second neural network distinct from the first neural network.

According to an embodiment, an electronic device may comprise a memory storing at least one instruction and at least one processor operatively coupled to the memory; wherein the processor, when executed by the at least one instruction, may be configured to obtain a first data set including a plurality of first words; obtain, based on a first neural network stored in the memory, from the first data set, a second data set including a first sub data set including first parameters corresponding to each of designated second words and a second sub data set including second parameters corresponding to each of the plurality of first words; and output, in response to obtain the second data set, based on parameters included in the second data set, one or more third words related to the plurality of first words; and wherein the first neural network may be trained based on a first weight factor applied to the first parameters corresponding to each of the second words and a second weight factor that is applied to the second parameter and is a difference from a designated value, using a second neural network distinct from the first neural network, and wherein the first weight factor and the second weight factor may be determined according to whether each of the output one or more third words match the plurality of first words or the second words.

The effects that can be obtained from the present disclosure are not limited to those described above, and any other effects not mentioned herein will be clearly understood to those having ordinary knowledge in the art to which the disclosure belongs, from the following description.

BRIEF DESCRIPTION OF THE DRAWINGS

The above and other aspects, features, and advantages of certain embodiments of the disclosure will be more apparent from the following description, taken in conjunction with the accompanying, in which:

FIG. 6 illustrates an example in which an electronic device according to an embodiment stores input data by a neural network.

DETAILED DESCRIPTION

Figure 1:
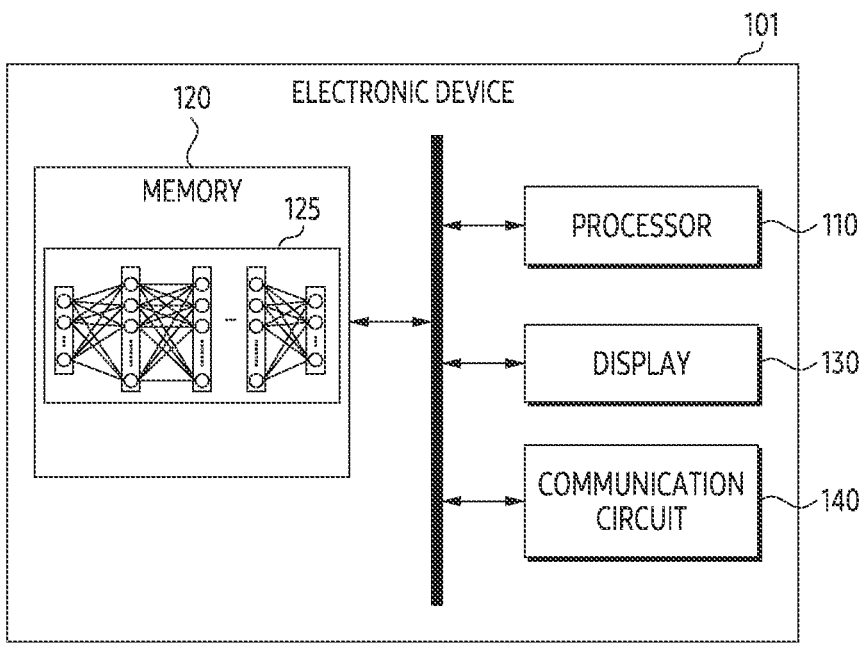
FIG. 1 is a block diagram of electronic devices according to various embodiments.

An electronic device and a method according to various embodiments can provide output in the form of natural language based on input words by a neural network.

In addition, the electronic device and the method can accurately process the natural language for neologism by weighting based on the input words.

The electronic device and the method can compare output words with input words and pre-stored words to assign a weight, and can abstract, by training neural networks based on the weight, outputs in the form of natural languages based on input sentences, and can use them for translation.

A specific structural or a functional description of the embodiments according to the concept of this invention are illustrated only for the purpose of describing the embodiments according to the concept of this invention, and the embodiments according to the concept may be implemented in various forms and are not limited to the embodiments described herein.

Since the embodiments according to the concept of the present invention may apply various changes and have various forms, the embodiments will be illustrated in the drawings and described in detail in the present specification. However, this is not intended to limit embodiments according to the concept of this invention to specific disclosure forms, and comprises changes, equivalents, or substitutes comprised in the spirit and technical scope of this invention.

Terms such as the first or the second may be used to describe various components, but the components should not be limited thereto. The terms are only used to distinguish one component from another, and for example, without departing from the scope of rights according to the concept of the present invention, the first component may be referred to as the second component, and similarly, the second component may be referred to as the first component.

When a component is referred to as "connected" or "accessed" to another component, it may be directly connected to or accessed to the other component, but it should be understood that another component may exist in the middle. On the other hand, when a component is referred to as "directly connected" or "directly accessed" to another component, it should be understood that no other component exists in the middle. Expressions describing the relationship between components, such as "between" and "right between" or "directly adjacent to" should also be interpreted in the same way.

The terms used in the present specification are used only to describe specific embodiments and are not intended to limit the present invention. Singular expressions comprise plural expressions unless they clearly otherwise mean in the context. In the present specification, it should be understood that the term "comprise" or "have" is intended to designate the existence of the described feature, number, step, operation, component, parts, or a combination thereof, and does not exclude the presence or additional possibility of one or more other features or numbers, step, operation, component, parts, or combination thereof.

Unless otherwise defined, all terms used herein, comprising technical or scientific terms, have the same meaning as those generally understood by those skilled in the art to which the present invention belongs. Terms such as those defined in commonly used dictionaries should be interpreted as having meanings consistent with those of the context of related technologies, and are not interpreted as ideal or excessively formal meanings unless clearly defined herein.

Hereinafter, embodiments will be described in detail with reference to the accompanying drawings. However, the scope of the patent application is not limited or restricted by these embodiments. The same reference numerals presented in each drawing represent the same member.

FIG. 1 is a block diagram of electronic devices according to various embodiments. Referring to FIG. 1, the electronic device 101 according to an embodiment may comprise at least one of a processor 110, a memory 120, a display 130, and a communication circuit 140. The processor 110, the memory 120, the display 130, and the communication circuit 140 may be electronically and/or operably coupled with each other by electronical component such as a communication bus. The type and/or number of hardware components comprised in the electronic device 101 is not limited to that illustrated in FIG. 1. For example, the electronic device 101 may comprise only some of the hardware components illustrated in FIG. 1.

The processor 110 of the electronic device 101 according to an embodiment may comprise a hardware component for processing data based on one or more instructions. Hardware components for processing data may comprise, for example, an Arithmetic and Logic Unit (ALU), a Field Programmable Gate Array (FPGA), and/or a Central Processing Unit (CPU). The number of processors 110 may be one or more. For example, the processor 110 may have a structure of a multi-core processor such as a dual core, a quad core, or a hexa core.

The memory 120 of the electronic device 101 according to an embodiment may comprise a hardware component for storing data and/or instructions input and/or output to the processor 110. The memory 120 may comprise, for example, a volatile memory such as a random-access memory (RAM) and/or a non-volatile memory such as a read-only memory (ROM). The volatile memory may comprise at least one of, for example, dynamic RAM (DRAM), static RAM (SRAM), cache RAM, and pseudo SRAM (PSRAM). The non-volatile memory may comprise, for example, at least one of a programmable ROM (PROM), an erasable PROM (EPROM), an electrically erasable PROM (EEPROM), a flash memory, a hard disk, a compact disk, and an embedded multi-media card (eMMC).

In the memory 120 of the electronic device 101 according to an embodiment, one or more instructions indicating an operation to be performed on data by the processor 110 may be stored. The set of instructions may be referred to as firmware, operating system, process, routine, sub-routine, and/or application. For example, the processor 110 of the electronic device 101 and/or the electronic device 101 may perform at least one of operations of FIG. 4 and FIG. 7 by executing a set of a plurality of instructions distributed in an application form.

A set of parameters related to the neural network 125 may be stored in the memory 120 of the electronic device 101 according to an embodiment. Neural network 125 is a recognition model implemented in software or hardware that imitates the computational ability of a biological system using a large number of artificial neurons (or nodes). The neural network 125 may perform a human cognitive action or a learning process through artificial neurons. Parameters related to the neural network 125 may represent, for example, a plurality of nodes comprised in the neural network 125 and/or a weight assigned to a connection between the plurality of nodes. The structure of the neural network 125 shown by a set of parameters stored in the memory 120 of the electronic device 101 according to an embodiment will be described later with reference to FIG. 2. The number of neural networks 125 stored in the memory 120 is not limited as shown in FIG. 1, and sets of parameters corresponding to each of a plurality of neural networks may be stored in the memory 120.

The display 130 of the electronic device 101 according to an embodiment may output visualized information to a user. For example, the display 130 may be controlled by a controller such as the processor 110 and/or a graphic processing unit (GPU) to output visualized information to a user. The display 130 may comprise a flat panel display (FPD) and/or an electronic paper. The FPD may comprise a liquid crystal display (LCD), a plasma display panel (PDP), and/or one or more light emitting diodes (LEDs). The LED may comprise an organic LED (OLED).

The communication circuit 140 of the electronic device 101 according to an embodiment may comprise a hardware component for supporting transmission and/or reception of an electrical signal between the electronic device 101 and the external electronic device. The communication circuit 140 may comprise, for example, at least one of a modem (MODEM), an antenna, and an optic/electronic (O/E) converter. The communication circuit 140 may support transmission and/or reception of electrical signals based on various types of protocols such as Ethernet, a local area network (LAN), a wide area network (WAN), a wireless Fidelity (WiFi), Bluetooth®, Bluetooth low energy (BLE)®, ZigBee®, Long Term Evolution (LTE), and 5G NR (New Radio).

The electronic device 101 according to an embodiment may form an output sentence based on a word of an input sentence using the neural network 125. The electronic device 101 may translate or summarize the output sentence based on the input sentence. For example, the input sentence may be English, and the electronic device 101 may convert the input sentence into Korean by dividing it by word or character using the neural network 125. For another example, the electronic device 101 may obtain an output sentence obtained by abstracting an input sentence using the neural network 125.

According to an embodiment, neural network 125 for sequence to sequence may be performed through a plurality of layers. For example, the input sentence may be stored in a data cell divided by a plurality of words, and neural network 125 may digitize the stored data cell through an embedding layer. According to an embodiment, neural network 125 may form digitized data as a context vector through an encoding layer. The context vector may be a vector created by compressing word information. The context vector may be in a state in which information of the input sentence is compressed. The encoder layer may transmit a context vector to the decoder layer, and the decoder layer may receive the context vector and sequentially output words one by one.

The electronic device 101 according to an embodiment may train the neural network 125 based on output words. The electronic device 101 may train the neural network 125 through another neural network distinct from the neural network 125. For example, the electronic device 101 may calculate a weight through another neural network in the process of generating words output through the neural network 125 and train the neural network 125 based on the calculated weight. For example, another neural network may train neural network 125 in relation to the selection of words to be output based on the calculated weight.

Hereinafter, referring to FIG. 2, a neural network 125 obtained by the electronic device 101 according to an embodiment based on a set of parameters stored in the memory 120 will be described. The neural network 125 of FIG. 2 may correspond to the neural network 125 of FIG. 1.

Figure 2:
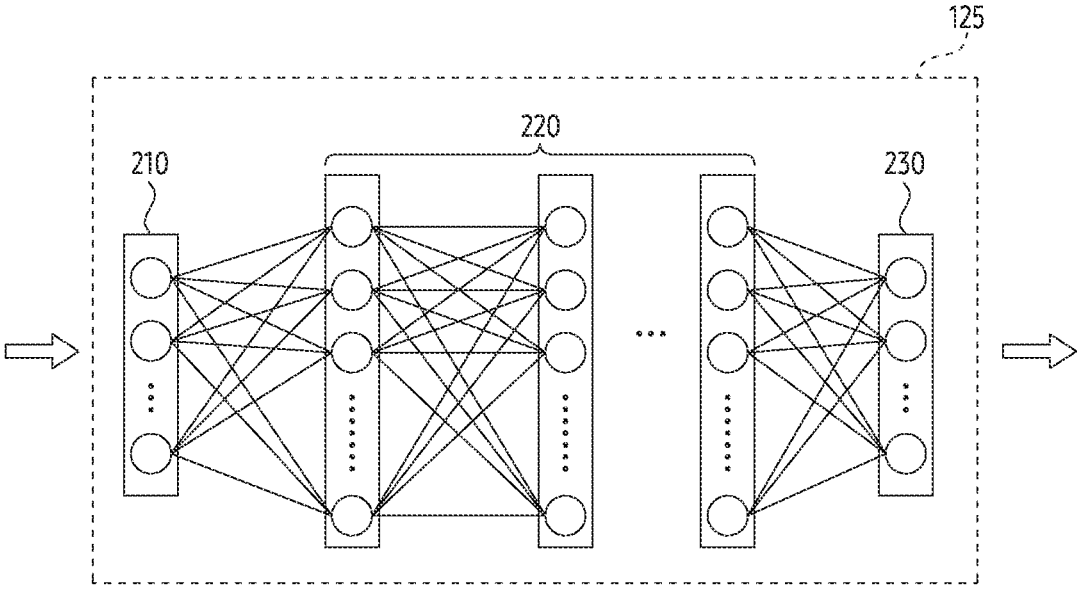
FIG. 2 is an exemplary diagram for describing a neural network obtained by an electronic device from a set of parameters stored in a memory according to an embodiment.

FIG. 2 is an exemplary diagram illustrating a neural network 125 obtained by an electronic device from a set of parameters stored in a memory according to an embodiment.

Referring to FIG. 2, the neural network 125 may comprise a plurality of layers. For example, the neural network 125 may comprise an input layer 210, one or more hidden layers 220, and an output layer 230. The input layer 210 may receive a vector (e.g., a vector having elements corresponding to the number of nodes comprised in the input layer 210) representing input data. Signals generated from each of the nodes in the input layer 210 generated by the input data may be transmitted from the input layer 210 to the hidden layers 220. Output layer 230 may generate output data of neural network 125 based on one or more signals received from hidden layers 220. The output data may comprise, for example, a vector having elements corresponding to the number of nodes comprised in the output layer 230.

Referring to FIG. 2, one or more hidden layers 220 may be positioned between the input layer 210 and the output layer 230, and input data transmitted through the input layer 210 may be converted into a value that is easy to predict. The input layer 210, one or more hidden layers 220, and the output layer 230 may comprise a plurality of nodes. One or more hidden layers 220 are not limited to the illustrated feedforward-based topology, and may be, for example, a convolution filter or a fully connected layer in a convolutional neural network (CNN), or various types of filters or layers bound based on special functions or features. In an embodiment, one or more hidden layers 220 may be layers based on a recurrent neural network (RNN) in which the output value is re-entered into the hidden layer of the current time. The neural network 125 according to an embodiment may comprise numerous hidden layers 220 to form a deep neural network. Training deep neural networks is called deep learning. Among the nodes of the neural network 125, a node comprised in the hidden layers 220 is referred to as a hidden node.

Nodes comprised in the input layer 210 and one or more hidden layers 220 may be connected to each other through a connection line having a connection weight, and nodes comprised in the hidden layer and the output layer may also be connected to each other through a connection line having a connection weight. Tuning and/or training the neural network 125 may mean changing the connection weights between nodes comprised in each of the layers comprised in the neural network 125 (e.g., the input layer 210, one or more hidden layers 220, and the output layer 230. Tuning of neural network 125 may be performed, for example, based on supervised learning and/or unsupervised learning.

The electronic device according to an embodiment may tune the neural network 125 based on reinforcement learning in unsupervised learning. For example, the electronic device may change policy information used by the neural network 125 to control the agent based on interaction between the agent and the environment. The policy information is a rule in which the electronic device determines the action of the agent in the environment using the neural network, and the electronic device may change policy information of the neural network by training the neural network based on the interaction between the agent and the environment. For example, the policy information may be changed so that the agent determines an optimal sequence of actions and/or actions to achieve the obtainable reward and/or goal. The electronic device according to an embodiment may cause a change in the policy information by the neural network 125 in order to maximize the goal and/or compensation of the agent by the interaction.

Hereinafter, referring to FIG. 3, it will be described that the electronic device according to an embodiment performs a natural language generation operation.

Figure 3:
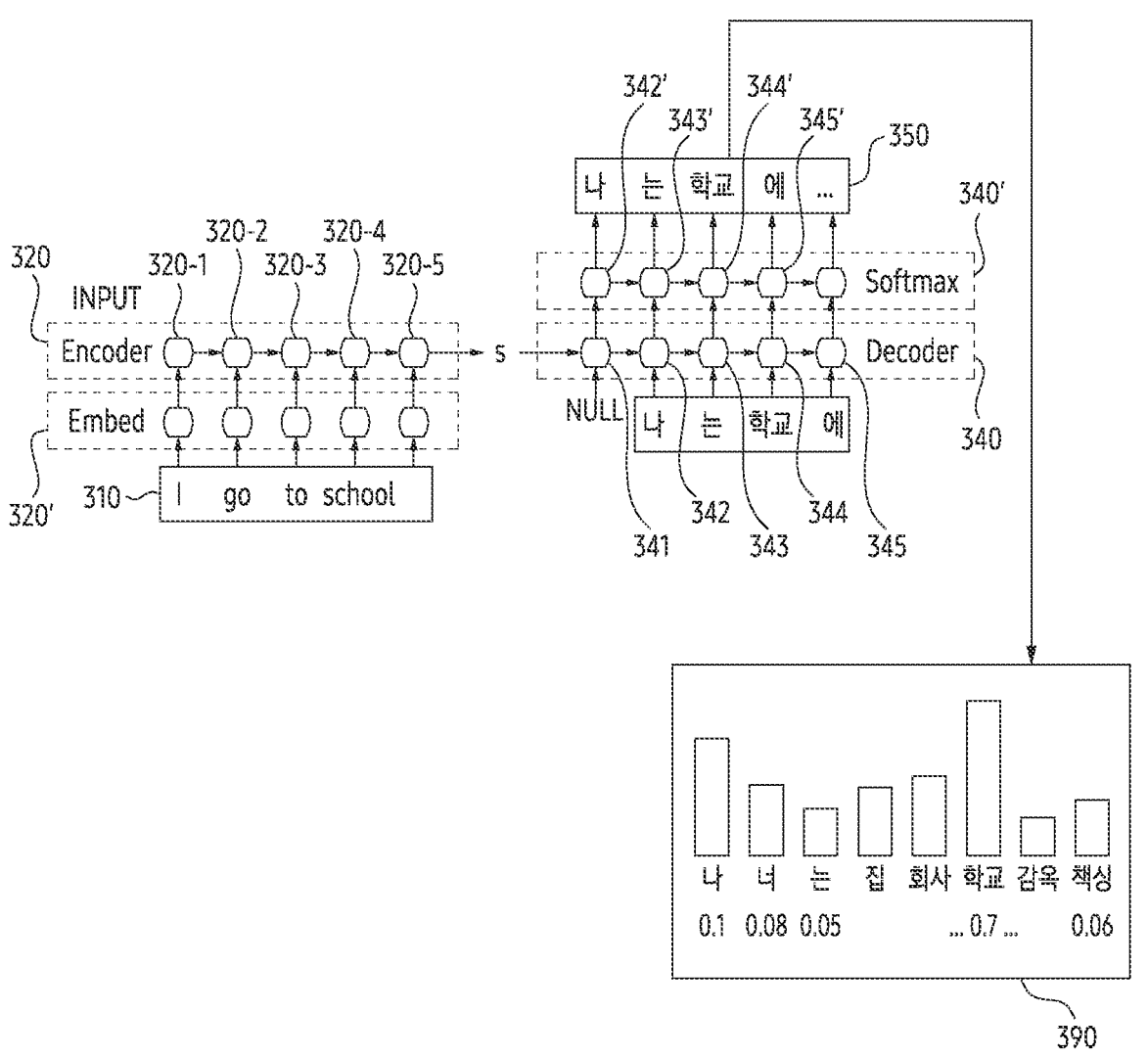
FIG. 3 is a flowchart illustrating an operation of generating a natural language by an electronic device according to an embodiment using a neural network.

FIG. 3 is an exemplary diagram for explaining a natural language generation operation by an electronic device according to an embodiment using a neural network.

Referring to FIG. 3, the processor (e.g., the processor 110 of FIG. 3) may generate a data set of a plurality of words for output from a data set consisting of a plurality of words.

The processor 110 may obtain a first data set comprising data 320-1, 320-2, 320-3, 320-4, and 320-5 corresponding to a plurality of first words comprised in the input sentence 310. The first data set comprising data 320-1, 320-2, 320-3, 320-4, and 320-5 corresponding to a plurality of first words may be an object processed by a neural network (e.g., the neural network 125 of FIG. 1). The first data set may be a data set of a plurality of first words corresponding to a sentence. A plurality of first words may be words comprised in the sentence.

According to an embodiment, the first data set may be a sentence provided by a user's input, but is not limited thereto. According to another embodiment, the first data set may be a set of words of a sentence obtained while performing an operation corresponding to the signal in response to the processor 110 receiving the designated signal. The first data set may be encoded in a form that processor 110 can process. For example, the processor 110 may transfer the input sentence 310 to the embedding layer 320'. The embedding layer 320' may convert natural language, which is input sentence 310, into digitized information. For example, neural network 125 may divide sentences or words transferred to the embedding layer 320' into grapheme units such as words, characters, or consonants and vowels. When the input sentence 310 is "I go to school", it may be expressed in an array of "I", "go", "to", and "school". As another example, the neural network 125 may group several characters and analyze them. In the case of expressing the input sentence 310 as a 3-gram that is grouped into 3 words, the input sentence 310 may be represented by an array of ["I g", "go", "go", "o t", "to", "to", "o s", "sc", "sch", "cho", "hoo", "ool"]. When digitizing a word, the embedding layer 320' may output the words in a vector form.

According to an embodiment, the encoder 320 may sequentially receive each of the data 320-1, 320-2, 320-3, 320-4, and 320-5 related to the character transmitted from the embedding layer 320'. After receiving the data 320-1, 320-2, 320-3, 320-4, 320-5, the encoder 320 may compress the data into a context vector (e.g., $\overrightarrow{s}$ of FIG. 3) and transmit the same to the decoder 340.

The last data 320-5 of the context vector may be a value of a hidden state. The hidden state value may summarize token information of data 320-1, 320-2, 320-3, 320-4, and 320-5 related to words comprised in the input sentence.

According to an embodiment, the first data 341 input to the decoder 340 may predict a word to be input to the second data 342 from a value in a hidden state and a NULL value, which is a current input value. The word to be input to the second data 342 may be an input value (e.g., second data 342) at a time point after the first data 341 is input. When each output vector of the data 341, 342, 343, 344, 345 is output from the decoder 340, each output vector may be returned as a probability value 390 of each of the plurality of words 342', 343', 344', and 345' through a softmax function 340', and the decoder 340 may determine the output word based on the returned probability value 390. For example, from the first data 341, the decoder 340 may predict that "L|", which is the second data 342, will be input. The softmax function 340' returns a probability distribution value for each word of the output sequence from the output vector of the first data 341, and the decoder 340 may predict the output word "L|" based on the probability distribution value for each word of the output sequence. For another example, the word having the highest probability value among the probability values assigned to candidates (or all words in the word dictionary) in the word dictionary of the third word 344 'may be selected. For example, processor 110 may obtain the first word 342', "L|", and the second word 343', "ㄱ/ㄱ", and then may select the third word 344', based on probability, from the candidate words of the third word 344' predicted based on the first word 342' and the second word 343'. Candidate words of the third word 344' may select "학교" having a probability value of 0.7 which is the highest probability value from the distribution of the probability value 390.

The natural language generation operation according to the above-described embodiment may generate a natural language output by using an attention distribution when outputting words of an output sentence.

Figure 4:
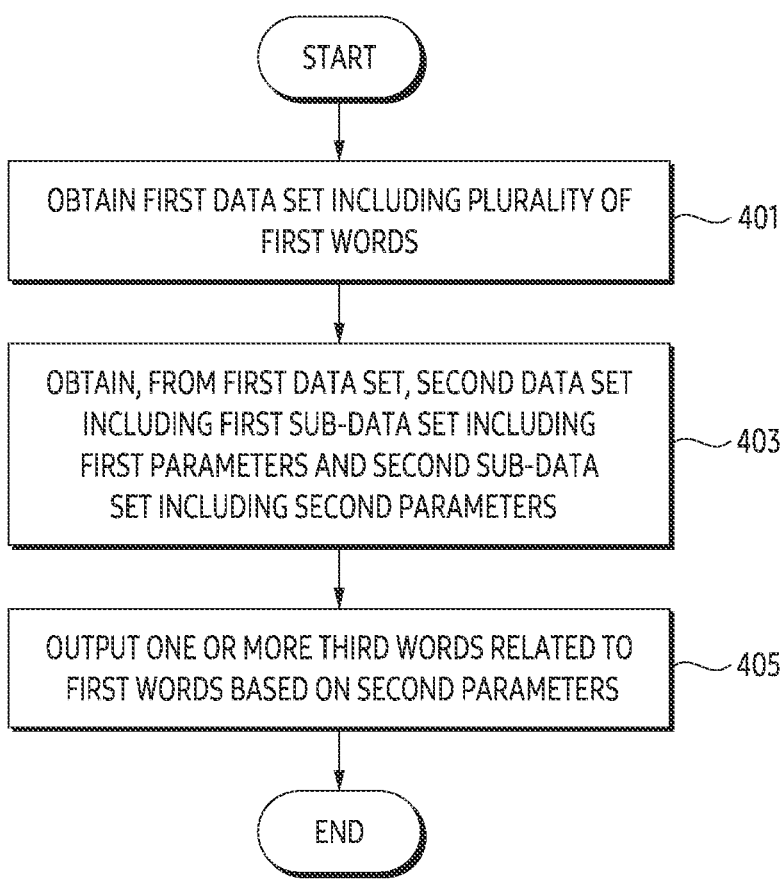
FIG. 4 is an exemplary diagram for explaining a natural language generation operation by an electronic device according to an embodiment using a neural network.

FIG. 4 is a flowchart illustrating an operation of generating a natural language by an electronic device using a neural network according to an embodiment.

Referring to FIG. 4, in operation 401, the processor (e.g., the processor 110 of FIG. 1) may obtain a first data set comprising a plurality of first words. The plurality of first data sets may be a set of encoded data 320-1, 320-2, 320-3, 320-4, and 320-5 of data digitized from an input sentence (e.g., the input sentence 310 of FIG. 3) through an embedded layer (e.g., the embedded layer 320' of FIG. 3) and an encoder (e.g., encoder 320 of FIG. 3). Among the encoded data 320-1, 320-2, 320-3, 320-4, and 320-5, the last data 320-5 may be a hidden value.

In operation 403, processor 110 may obtain a first sub-data set comprising first parameters from the first data set and a second data set comprising a second sub-data set comprising second parameters. According to an embodiment, the processor 110, based on the first neural network (e.g., the neural network 125 of FIG. 1) stored in the memory (e.g., the memory 120 of FIG. 1), from the first data set, may obtain a second data set comprising a first sub-dataset comprising first parameters corresponding to each of a plurality of designated second words and a second sub-dataset comprising second parameters corresponding to each of the plurality of first words.

According to an embodiment, the first neural network may be a recurrent neural network RNN for generating natural language. The first neural network may comprise weights assigned to the input layer 210, one or more hidden layers 220 of FIG. 2, nodes comprised in the output layer 230, and connections between the nodes.

According to an embodiment, the first sub-data set may comprise first parameters obtained based on a plurality of first words comprised in the input sentence 310. The first parameters may be a plurality of second words obtained from the first word through the first neural network. A plurality of second words may be words comprised in an output sentence (e.g., the output sentence 350 of FIG. 3). For example, a plurality of second words may be a plurality of words 342', 343', 344', and 345' obtained through a softmax function (e.g., the softmax function 340' of FIG. 3). The first parameters may be a set of probability values (e.g., probability values 390 of FIG. 3) of each of the plurality of words 342', 343', 344', and 345'. The first parameters may be dispersion values comprising probability values 390 corresponding to a plurality of words 342', 343', 344', and 345'.

The first parameters may be a distribution in which each of the data 320-1, 320-2, 320-3, 320-4, and 320-5 corresponding to the plurality of first words corresponds to words stored in a memory (e.g., the memory 125 of FIG. 1). The first parameters may be obtained through the following process. The processor 110 may obtain a dispersion value to which candidates of the first word 342' are to be selected among a plurality of words 342', 343', 344', and 345'. The candidates may be candidate words to be selected in the word dictionary or all words in the word dictionary. The word dictionary may be a set of a plurality of words stored in the memory 120, words previously stored in the memory 120, or may further comprise words obtained by learning the neural network.

The processor 110, using the first neural network, may select the first output word based on a dispersion value of candidates of the first word 342', which is one of the first parameters, and a second parameter value related to the first word 342'. Processor 110 may generate one of the first parameters, which is a dispersion value of the predicted candidates of the second word 343', based on the first output word. Based on the above-described method, the processor 110 may generate first parameters having dispersion values corresponding to the first word 342', the second word 343', the third word 344', and the fourth word 345'.

According to an embodiment, the second sub-data set may comprise second parameters obtained based on a plurality of first words comprised in the input sentence 310. The second parameters, with reference to the input sentence 310, may comprise a degree of association with a predicted output word whenever an output word corresponding to each of the data 320-1, 320-2, 320-3, 320-4 and 320-5 corresponding to the plurality of first words is selected. For example, the degree of association may be referred to as an attention. Processor 110 refers to all data 320-1, 320-2, 320-3, 320-4 and 320-5 corresponding to a plurality of first words, but processor 110 may not refer to the data 320-1, 320-2, 320-3, 320-4 and 320-5 at the same ratio, but may give a high degree of association to an input word related to a word to be predicted.

According to an embodiment, the second data set may comprise a first sub-data set and second sub-data. The processor 110, based on the first neural network, may obtain the second data set comprising a first sub-data set comprising first parameters corresponding to each of a plurality of second words and a second sub-data set comprising second parameters corresponding to each of the plurality of first words.

In operation 405, after obtaining the second data set, processor 110 may output third words based on the first parameters and the second parameters. For example, processor 110 may output an output sentence comprising one or more third words related to a plurality of first words comprised in input sentence 310 based on the first parameters and the second parameters of the second data set.

According to an embodiment, the processor 110 may generate weights based on the first parameters and the second parameters. Processor 110 may obtain weights associated with the first parameters and the second parameters through the following operations. Processor 110 may obtain a weight by comparing words appearing in input sentence 310 and output sentence 350.

According to an embodiment, the processor 110 may select whether to generate an output word from the first parameters or whether to generate an output word from the second parameters according to the obtained weight. For example, processor 110 may select a word having a high distribution value from among the first parameters that are distributed in the dictionary words, and may select a word having a high distribution value from among the second parameters that are an attention distribution of input sentence 310.

According to an embodiment, the first neural network may be trained based on a first weight applied to the first parameters and a second weight applied to the second parameters corresponding to each of the second words obtained using a second neural network different from the first neural network. To select a parameter from among the first parameters and the second parameters, processor 110 may use a loss function.

The loss function may be defined by Equation 1 below.

$$\text{loss}^t = -\log P(w_t^*) \qquad \text{[Equation 1]}$$

$$P(w) = p_{gen}p_{vocab}(w) + (1 - p_{gen})\sum\nolimits_{i:w_i=w}\alpha_{t,i}$$

In the above equation, loss$^t$ may be a total loss function. The loss function may be a function that quantifies a difference between an actual value and a predicted value. The difference between the actual value and the predicted value, and the larger the error, the higher the value of the loss function, and the smaller the error, the lower the value of the loss function. The loss function may calculate an error value using a cross-entropy method.

The $P_{gen}$ may be a value for determining whether to generate an output word from the word distribution in the dictionary or to generate an output word from the attention distribution of the input sentence 310, and may have a value between 0 and 1.

$w^*_t$ may be a target word for generating, and $\alpha_{t,i}$ may be second parameters that are an attention probability distribution of an input sentence. $P_{vocab}$ is a basic loss function of the Seq2Seq (sequence to sequence) method and may be first parameters that are word distributions in a dictionary.

The processor 110 may determine the accuracy of the word output from the input word from the loss function derived as described above, and train the neural network.

According to another embodiment, the processor 110 may define and use a loss function different from the loss function, e.g., as defined in the Equation 2.

$$\text{loss}^t = \text{loss}^t_{vocab} + \text{loss}^t_{attn} + \text{loss}^t_{p_{gen}} \qquad \text{[Equation 2]}$$

In the loss function of Equation 2, loss' may be a total loss function, $\text{loss}_{vocab}{}^t$ may be a word loss, $\text{loss}_{attn}{}^t$ may be an attention loss, and $\text{loss}_{P_{gen}}{}^t$ may be a copy loss.

According to an embodiment, the processor 110 may train the first neural network in the direction of minimizing the loss function loss' through the second neural network distinct from the first neural network.

Figure 5:
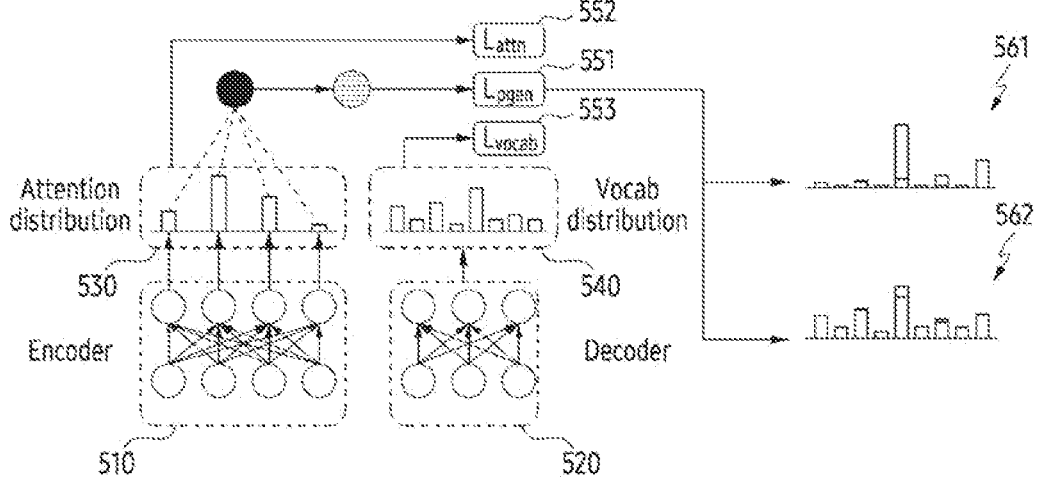
FIG. 5 is an exemplary diagram for explaining a learning operation for generating a natural language by an electronic device according to an embodiment using a neural network.
Figure 7:
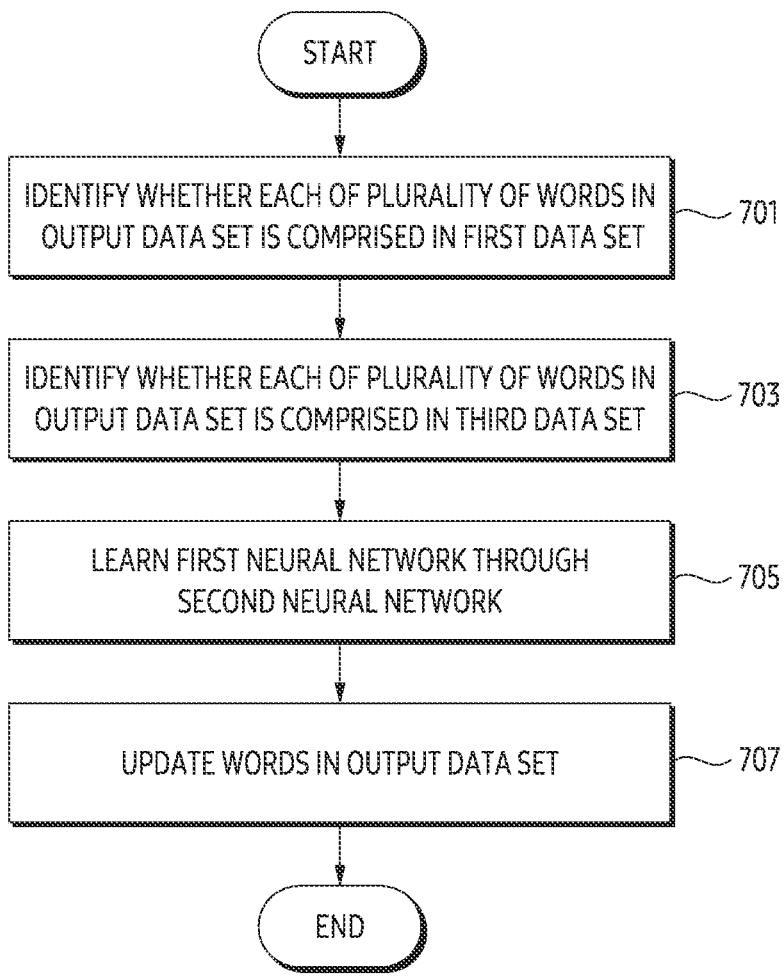
FIG. 7 is a flowchart illustrating an output word generation operation and a learning operation by an electronic device according to an embodiment.

In FIGS. 5 to 7, which will be described later, an operation of reducing a copy loss for the electronic device to reduce a loss function value using a neural network will be described.

According to the above-described embodiment, the electronic device may improve accuracy of an output word output in a natural language by considering a word loss based on a word distribution in a dictionary without obtaining a loss function through an attention distribution alone.

FIG. 5 is an exemplary diagram for explaining a learning operation for generating a natural language by an electronic device according to an embodiment using a neural network, FIG. 6 illustrates an example in which an electronic device according to an embodiment stores input data by a neural network, and FIG. 7 is a flowchart illustrating an output word generation operation and a learning operation by an electronic device according to an embodiment.

Referring to FIG. 5, the first data set 610 may be a set of words of the input sentence 510. The processor 110 or the neural network may obtain an attention distribution for each word of the first data set 610. The attention distribution may be a distribution related to the words and the degree of associations of the first data set 610 of the input sentence 510 when an output word for one of the words of the input sentence 510 is selected. The first parameters 530 may be data related to the attention distribution.

Processor 110 may obtain second parameters 540 that are word distributions in the dictionary among output sentences 520. The second parameters 540, when one of the words in output sentence 520 is selected, may be a distribution related to a degree of association of one word among words of the output sentence 520 with a dictionary word. The second parameters 540 may be data related to a distribution related to a degree of association with the dictionary word.

According to an embodiment, the processor 110 may obtain the attention loss 552 from the first parameters 530, and may obtain the word loss 553 from the second parameters 540. The copy loss 551 may be determined based on the following operation.

According to an embodiment, the processor 110 may obtain a copy loss 551 value based on a word of the output sentence 520 and a word of the input sentence 510.

Referring to FIG. 6, the first data set 610 may be an input sentence. For example, the first data set 610 of FIG. 6 may comprise words A, B, and C of the input sentence 510 of FIG. 5. The second data set 620 may comprise first parameters 530 and second parameters 540. The third data set 630 may comprise data A, C, D, . . . , and Z related to words written in the dictionary. The output data set 640 may comprise words B, C, and Z comprised in the output sentence 520.

According to an embodiment, the electronic device (e.g., the electronic device 101 of FIG. 1) may comprise a plurality of neural networks. The RNN-based neural network described above with reference to FIGS. 3 to 5 may be defined as a first neural network, and a neural network that trains the first neural network may be defined as a second neural network. A plurality of neural networks of the electronic device 101 may comprise a first neural network and a second neural network.

In an embodiment, the processor (e.g., the processor 110 of FIG. 1) may compare the word B of the output data set 640 obtained from the first neural network with words comprised in the first data set 610 to identify whether the word B of the output data set 640 is comprised in the first data set 610.

According to an embodiment, the processor 110, using the first neural network, when one of the words of the output data set 640 exists in the input sentence and is not comprised in the third data set 630 that is a set of words in the dictionary stored in the memory, using the attention distribution, may copy the word from the first data set 610 to the output data set 640.

When the first neural network wants to output the one word among the words of the output data set 640, it may obtain a loss function of the word to be output and induce the output word to be copied using an attention distribution based on the obtained loss function. The first neural network may learn attention information of an output word selected by a loss function using the second neural network.

According to an embodiment, when another word in the output data set 640 exists in the input sentence and is comprised in the third data set 630 which is a set of words in the dictionary stored in the memory (e.g., the memory 120 of FIG. 1), processor 110 may induce a word to be generated from a probability distribution for third data set 630. When outputting one word of output data set 640, the first neural network may obtain a loss function and induce the output word to be copied using a word distribution in a dictionary based on the obtained loss function. The first neural network may learn attention information of an output word selected by a loss function using the second neural network.

According to an embodiment, when another word in the output data set 640 does not exist in the input sentence, the processor 110 may generate an entire loss function and copy the output word from the distribution of the dictionary word.

According to an embodiment, the processor 110 may identify whether the word "B" in the output data set 640 is comprised in input words in the first data set 610. Processor 110 may compare whether the word "B" is present in the third data set 630 based on identifying the presence of the word "B" in the first data set 610. The processor 110 may induce the word "B" to be copied using the attention distribution of the first data set 610 through a loss function weighted to the first parameters 530 of the second data set 620 based on identifying whether the word "B" is present in the third data set 630. According to an embodiment, the word "B" is a word that is not in the third data set 630 stored in the memory 120 and may be a neologism. For example, the word "B" may be a word such as "COVID-19" generated after 2019.

According to an embodiment, the processor 110 may identify whether the word "C" in the output data set 640 is comprised in input words in the first data set 610. Processor 110 may compare whether the word "C" is present in the third data set 630 based on identifying the presence of the word "C" in the first data set 610. The processor 110, based on identifying the presence of the word "C" in the third data set 630, through a loss function weighted to the second parameters 540 among the second data set 620, using the probability distribution of the third data set 630, may induce the word "C" to be copied. According to an embodiment, the word "C" may be comprised in a word dictionary and may be a word used several times in an input sentence.

According to an embodiment, processor 110 may identify whether the word "Z" in output data set 640 is comprised in input words in the first data set 610. Processor 110, based on identifying that the word "Z" is not comprised in the first data set 610 through a loss function weighted to the second parameters 540 among the second data set 620, using the probability distribution of the third data set 630, may induce the word "Z" to be copied. According to an embodiment, the word "Z" is comprised in the word dictionary, and a value corresponding to the word "Z" in the attention distribution may be relatively low.

According to an embodiment, processor 110 may be used in an operation of performing an abstractive summarization when it is present in the third date set 620 (e.g., words in a dictionary) among words of output data set 640, and is also present in an input sentence. For example, for abstractive summarization, the processor 110 may perform an abstractive summarization operation by using the word distribution of a dictionary through matching with the third date set 620 even when it is present in the input sentence.

According to an embodiment, when the words of the output data set 640 does not exist in the third data set 620 and exists only in the first data set 610, the processor 110 may copy the words of the first data set 610 and learn them as neologism. According to an embodiment, when the words of the output data set 640 is not present in the first data set 610 and is present only in the third data set 620, the processor 110 may copy and use the words of the third data set 620 to perform a translation operation.

Referring to FIG. 7, in operation 701, the processor 110 may identify whether each of a plurality of words in the output data set 640 is comprised in the first data set 610.

Processor 110 may identify whether a plurality of words in output data set 640 are sequentially comprised in the first data set 610 through the first neural network. According to an embodiment, processor 110 may know the order of words comprised in output data set 640 based on the context vector corresponding to the words of first data set 610. Processor 110 may sequentially identify whether words corresponding to the order of words comprised in output data set 640 are comprised in the first data set 610. Processor 110 may identify whether one word comprised in output data set 640 is comprised in the first data set 610 and then may identify whether another word in the order after the one word among the words comprised in output data set 640 is comprised in the first data set 610. According to another embodiment, the processor 110, after identifying whether one word comprised in the output data set 640 is comprised in the first data set 610, after performing operations 703 to 707, may identify whether another word in an order following the one word among words comprised in the output data set 640 is comprised in the first data set 610.

In operation 703, processor 110 may identify whether each of a plurality of words in output data set 640 is comprised in the third data set 630.

According to an embodiment, processor 110 may identify whether words of output data set 640 that identify whether words are comprised in the first data set 610 are comprised in the third data set 630, through operation 701. Processor 110 may sequentially identify whether words corresponding to the order of words comprised in output data set 640 are comprised in third data set 630.

In operation 705, the processor 110 may train the first neural network through the second neural network.

According to an embodiment, processor 110 may train the first neural network through the second neural network based on whether one word of the words comprised in output data set 640 is comprised in the first data set 610 and/or the third data set 630. For example, the second neural network may obtain at least one weight based on whether each of the words comprised in the output data set 640 is comprised in the first data set 610 and/or the third data set 630, attention, and/or dictionary word distribution. The second neural network may train the first neural network based on the obtained at least one weight.

According to an embodiment, when one word of the words comprised in the output data set 640 is comprised in the first data set 610, the processor 110 may determine the word of the output data set 640 based on Equation 3 below.

$$\text{loss}_{P_{gen}} = \begin{cases} -\log(1 - p_{gen}) \text{ if } w_t^* \in X & \text{[Equation 3]} \\ -\log(p_{gen}) \text{ otherwise} \end{cases}$$

In Equation 3, $\text{loss}_{P_{gen}}$ may mean a copy loss, $w_t^*$ may mean a word to be output, and X may be a first data set 610 that is words of an input sentence.

When the $\text{loss}_{P_{gen}}$ value decreases, the copy loss function value may decrease. Processor 110, through the first neural network, when the word $w_t^*$ to be output in the output data set 640 exists in the first data set 610 that is input data, the word comprised in the input sentence can be copied, may set a $P_{gen}$ value.

According to an embodiment, the first neural network, when the $P_{gen}$ value of "B" in the words of the output data set 640 is learned to be 0.01, Since "B" exists in the first data set 610 which is input data, may obtain a loss function value close to 0 with −log 99+log 100. According to an embodiment, the first neural network may obtain a loss function value of −log (0.1)=10 when the $P_{gen}$ value of "Z" is learned to be 0.1 among words of the output data set 640. The electronic device according to an embodiment may obtain the total loss function value of Equation 2 based on the value of the loss function obtained by Equation 3.

According to an embodiment, when a word in the output data set 640 is comprised in the first data set 610 that is a set of words in the input sentence, the word in the output data set may be copied from the word in the first data set 610 using the force-copy method. The first neural network may define the copy loss function as Equation 3 to update the attention distribution and may induce the word to be copied through the updated attention distribution.

$$\text{loss}_{P_{gen}} = \begin{cases} -\log(1 - p_{gen}) \text{ if } w_t^* \in X, \notin V & \text{[Equation 4]} \\ -\log(p_{gen}) \text{ otherwise} \end{cases}$$

In Equation 4, $\text{loss}_{P_{gen}}$ means a copy loss function, $w_t^*$ may be a word to be output, X may be a first data set 610 that is words of an input sentence, and V may be a third data set 630 that is a set of dictionary words stored in a memory.

When the $\text{loss}_{P_{gen}}$ value decreases, the copy loss function value may decrease. When the word $w_t^*$ to be output in the output data set 640 is present in the first data set 610 that is a set X of words of the input sentence that is input data and is not present in the third data set 630 that is a set V of word dictionaries, a $P_{gen}$ value may be set to copy words comprised in the input sentence.

According to an embodiment, the first neural network, when the $P_{gen}$ value of "B" in the words of the output data set 640 is learned to be 0.01, since "B" exists in the first data set 610 that is input data and does not exist in the third data set 630, may obtain a loss function value close to 0 by −log 99+log 100. According to an embodiment, since "Z" does not exist in the first date set 610 which is input data, The first neural network may obtain a loss function value of −log (0.1)=10 when the $P_{gen}$ value of "Z" is learned to be 0.1 among words of the output data set 640. According to an embodiment, when the $P_{gen}$ value of "C" in the words of the output data set 640 is learned to be 0.01, when "C" is present in the first date set 610 that is input data, since "Z" is not present in the third date set 630 that is input data, the first neural network may obtain a loss function value of −log (0.01) =100. The electronic device according to an embodiment may obtain the entire loss function value of Equation 2 based on the value of the loss function obtained by Equation 4.

According to an embodiment, when the word in the output data set 640 is comprised in the first data set 610 that is a set of words in the input sentence and is not comprised in the third data set 630, using the force-copy-unknown method, the word in the output data set may be copied from the word in the first data set 610. The first neural network may define the copy loss function as Equation 4 to update the attention distribution and may induce the word to be copied through the updated attention distribution.

According to an embodiment, when a word in output data set 640 is comprised in both the first data set 610 and the third data set 630, the second neural network may train the first neural network to generate from a word distribution in a dictionary without inducing the first neural network to copy from a word in an input sentence. The second neural network may notify the first neural network during the learning process that the same word exists in the input sentence through the attention loss function (loss an) among the entire loss function (loss).

In operation 707, processor 110 may update the word of output data set 640.

Processor 110 may update the word of output data set 640 based on the learning result through the first neural network. According to an embodiment, when following Equation 3, the processor 110 may maintain the word in the output data set 640 when the word in the output data set 640 is comprised in the first data set 610, and may update the word through an attention distribution when the word in the output data set 640 is not a word in the first data set 610.

According to another embodiment, when words in the output data set 640 are comprised in the first data set 610 and the third data set 630, using Equation 4, processor 110 may update the output word according to the word distribution in the dictionary among the words comprised in the third data set 630 without unconditionally copying the words in the first data set 610. Processor 110 may induce the output word to be identified from the word in first dataset 511 when the word in output dataset 640 is comprised in first dataset 610 but not comprised in third dataset 630.

According to the above-described embodiment, the electronic device comprising the first neural network and the second neural network may improve abstractness of the summary result by reducing unnecessary copying operations. The electronic device may improve the accuracy of natural language generation by using not only the attention probability distribution but also the dictionary word distribution.

According to the above-described embodiment, an electronic device (e.g., the electronic device 101 of FIG. 1) may comprise a memory (e.g., the memory 120 of FIG. 1) storing at least one instruction; and at least one processor (e.g., the processor 110 of FIG. 1) operatively coupled to the memory; wherein the processor, when executed by the at least one instruction, may be configured to obtain a first data set (e.g., a first data set including a plurality of first words 320-1, 320-2, 320-3, 320-4, and 320-5 of FIG. 3) including a plurality of first words; obtain, based on a first neural network (e.g., the neural network 125 of FIG. 1) stored in the memory, from the first data set, a second data set (e.g., the second data set 620 of FIG. 6) including a first sub data set including first parameters (e.g., the first parameters 530 of FIG. 5) corresponding to each of designated second words (e.g., words included in the output sentence 350 of FIG. 3) and a second sub data set including second parameters (e.g., the second parameters 540 of FIG. 5) corresponding to each of the plurality of first words; and output, in response to obtain the second data set, based on parameters included in the second data set, one or more third words (e.g., words included in the output sentence 350 of FIG. 3) related to the plurality of first words; and wherein the first neural network may be trained based on a first weight factor applied to the first parameters corresponding to each of the second words and a second weight factor applied to the second parameter, using a second neural network distinct from the first neural network.

According to an embodiment, when executed by the at least one instruction, the processor may train, using the second neural network, based on the second weight factor exceeded to the first weight factor, the first neural network such that at least one of the one or more third words is selected based on the plurality of first words.

According to an embodiment, the second neural network may train the first neural network, based on the first weight factor and the second weight factor adjusted such that at least one of one or more of the third words is selected based on one or more words of the plurality of first words different from the plurality of second words.

According to an embodiment, the first parameters may be a first distribution corresponding to each of the plurality of second words among words in the second data set.

According to an embodiment, the second parameters may be a second distribution corresponding to each of the plurality of first words among words in the second data set.

According to an embodiment, when executed by the at least one instruction, the processor may determine at least one of the first weight factor or the second weight factor, so that the summation of the first weight factor and the second weight factor matches a designated numerical value.

According to an embodiment, the first weight factor and the second weight factor may be determined according to whether each of the output one or more third words match the plurality of first words or the second words.

According to an embodiment, the first data set may include an arrangement order of the plurality of first words, and the plurality of third words may be generated according to the arrangement order of the plurality of first words.

According to an embodiment, when executed by the at least one instruction, the processor may be configured to update the plurality of third words based on the first weight factor and the second weight factor.

According to an embodiment, when executed by the at least one instruction, the processor may be configured to obtain the first weight factor or the second weight factor to update words matching the designated plurality of second words, among the plurality of third words.

According to an embodiment, a method of electronic device may comprise obtaining a first data set including a plurality of first words; obtaining, based on a first neural network stored in the memory of the electronic device, from the first data set, a second data set including a first sub data set including first parameters corresponding to each of designated second words and a second sub data set including second parameters corresponding to each of the plurality of first words; and outputting, in response to obtaining the second data set, based on parameters may be included in the second data set, one or more third words related to the plurality of first words; and wherein the first neural network may be trained based on a first weight factor applied to the first parameters corresponding to each of the second words and a second weight factor applied to the second parameter using a second neural network distinct from the first neural network.

According to an embodiment, the second neural network may train, using the second neural network, based on the second weight factor exceeded to the first weight factor, the first neural network such that at least one of the one or more third words is selected based on the plurality of first words.

According to an embodiment, wherein the second neural network may train the first neural network, based on the first weight factor and the second weight factor adjusted such that at least one of one or more of the third words is selected based on one or more words of the plurality of first words different from the plurality of second words.

According to an embodiment, wherein the first parameters may be a first distribution corresponding to each of the plurality of second words among words in the second data set.

According to an embodiment, wherein the second parameters may be a second distribution corresponding to each of the plurality of first words among words in the second data set.

According to an embodiment, wherein the first weight factor and the second weight factor may be determined according to whether each of the output one or more third words match the plurality of first words or the second words.

According to an embodiment, when the at least one instruction is executed, the processor, may determine at least one of the first weight factor or the second weight factor, so that the summation of the first weight factor and the second weight factor matches a designated numerical value.

According to an embodiment, an electronic device (e.g., the electronic device 101 of FIG. 1) may comprise a memory (e.g., memory 120 in FIG. 1) storing at least one instruction; and at least one processor (e.g., processor 110 in FIG. 1) operatively coupled to the memory, when executed by the at least one instruction, the processor may be configured to obtain a first data set including a plurality of first words; obtain, based on a first neural network (e.g., neural network 125 in FIG. 1) stored in the memory, from the first data set, a second data set including a first sub data set including first parameters corresponding to each of designated second words and a second sub data set including second parameters corresponding to each of the plurality of first words; and output, in response to obtain the second data set, based on parameters included in the second data set, one or more third words related to the plurality of first words; and wherein the first neural network may be trained based on a first weight factor applied to the first parameters corresponding to each of the second words and a second weight factor that is applied to the second parameter and is a difference from a designated value, using a second neural network distinct from the first neural network; and wherein the first weight factor and the second weight factor may be determined according to whether each of the output one or more third words match the plurality of first words or the second words.

According to an embodiment, when executed by the at least one instruction, the processor may train, using the second neural network, based on the second weight factor exceeded to the first weight factor, the first neural network such that at least one of the one or more third words is selected based on the plurality of first words.

According to an embodiment, wherein the second neural network may train the first neural network, based on the first weight factor and the second weight factor adjusted such that at least one of one or more of the third words is selected based on one or more words of the plurality of first words different from the plurality of second words.

The device described above may be implemented as a hardware component, a software component, and/or a combination of the hardware component and the software component. For example, the devices and components described in the embodiments may be implemented using one or more general purpose computers or special purpose computers, for example, such as a processor, a controller, an arithmetic logic unit (ALU), a digital signal processor, a microcomputer, a field programmable gate array (FPGA), a programmable log unit (PLU), a microprocessor or any other device capable of executing and responding to instructions. The processing device may perform an operating system OS and one or more software applications performed on the operating system. In addition, the processing device may access, store, operate, process, and generate data in response to the execution of the software. For convenience of understanding, one processing device may be described as used, but those skilled in the art may see that the processing device may comprise a plurality of processing elements and/or a plurality of types of processing elements. For example, the processing device may comprise a plurality of processors or one processor and one controller. Other processing configurations, such as parallel processors, are also possible.

The software may comprise a computer program, code, instruction, or a combination of one or more of them, and may configure the processing device to operate as desired or command the processing device independently or collectively. Software and/or data may be permanently or temporarily embodied in any type of machine, component, physical device, virtual equipment, computer storage medium or device, or signal wave transmitted to be interpreted by the processing device or to provide instructions or data to the processing device. Software may be distributed over networked computer systems and stored or executed in a distributed method. Software and data may be stored in one or more computer-readable recording medium.

The method according to the embodiment may be implemented in the form of a program instruction that may be performed through various computer means and recorded in a computer-readable medium. The computer-readable medium may comprise a program instruction, a data file, a data structure, etc. alone or in combination. Program instructions recorded on the medium may be specially designed and configured for embodiments or may be known to or usable by those skilled in computer software. Examples of computer-readable recording medium comprise magnetic media such as hard disks, floppy disks, and magnetic tapes, optical media such as CD-ROMs and DVDs, magneto-optical media such as floptical disk, and hardware devices specifically configured to store and perform program instructions such as ROM, RAM, and flash memory, etc. Examples of program instructions comprise not only machine language codes such as those generated by compilers, but also high-level language codes that may be executed by computers using interpreters, etc. The hardware devices described above may be configured to operate as one or more software modules to perform the operations of the embodiments, and vice versa.

Although embodiments have been described according to limited embodiments and drawings as above, various modifications and variations are possible from the above description by those skilled in the art. For example, an appropriate result may be achieved even if the described techniques are performed in a different order from the described methods, and/or components of the described systems, structures, devices, circuits, etc. are coupled or combined in different forms from the described methods, or are replaced or substituted by other components or equivalents.

Therefore, other implementations, other embodiments, and equivalents to the claims are also within the scope of the following claims.

What is claimed is:

1. An electronic device, comprising:
a memory storing at least one instruction; and
at least one processor operatively coupled to the memory,
wherein, the memory stores instructions which, when executed by the processor, cause the processor to perform operations comprising:
identifying a request for generating an output sentence corresponding to an input sentence including first words;
based on the request, obtaining parameters corresponding to respective words including a first set of preset words and a second set of first words; and
generating, based on the parameters, the output sentence including second words including at least one word in the first set of preset words and at least one word in the second set of first words.

2. The electronic device of claim 1, wherein, the memory stores instructions which, when executed by the processor, cause the processor to perform operations further comprising:
obtaining the parameters based on computations of a first neural network, wherein the first neural network is trained based on a first weight factor applied to a first portion of the parameters corresponding to each of the first set of preset words and a second weight factor applied to a second portion of the parameters corresponding to each of the second set of first words, based on computations of a second neural network distinct from the first neural network.

3. The electronic device of claim 2, wherein, the memory stores instructions which, when executed by the processor, cause the processor to perform operations further comprising:
training, using the second neural network, based on the second weight factor exceeded to the first weight factor, the first neural network such that at least one of the one or more third words is selected based on the plurality of first words.

4. The electronic device of claim 2, wherein the second neural network trains the first neural network, based on the first weight factor and the second weight factor adjusted such that at least one of one or more of the third words is selected based on one or more words of the plurality of first words different from the plurality of designated second words.

5. The electronic device of claim 2, wherein the first portion of the parameters are a first distribution corresponding to each of the plurality of designated second words among words in the second data set; and
wherein the second portion of the parameters are a second distribution corresponding to each of the plurality of first words among words in the second data set.

6. The electronic device of claim 2, wherein, the memory stores instructions which, when executed by the processor, cause the processor to perform operations further comprising:
determining at least one of the first weight factor or the second weight factor, so that the summation of the first weight factor and the second weight factor matches a designated numerical value.

7. The electronic device of claim 2,
wherein the first weight factor and the second weight factor are determined according to whether each of the output one or more third words matches the first words or the first set of preset words.

8. The electronic device of claim 1, wherein the second word included in the outputs sentence
are generated according to the arrangement order of the first words included in the input sentence.

9. The electronic device of claim 2, wherein, the memory stores instructions which, when executed by the processor, cause the processor to perform operations further comprising:
updating the second words included in the output sentence based on the first weight factor and the second weight factor.

10. The electronic device of claim 9, wherein, the memory stores instructions which, when executed by the processor, cause the processor to perform operations further comprising:
obtaining the first weight factor or the second weight factor to update words matching the first set of preset words, among the second words included in the output sentence.

11. A method of electronic device, comprising:
identifying a request for generating an output sentence corresponding to an input sentence including first words;
based on the request, obtaining parameters corresponding to respective words including a first set of preset words and a second set of first words; and
generating, based on the parameters, the output sentence including second words including at least one word in the first set of preset words and at least one word in the second set of first words.

12. The method of electronic device of claim 11, further comprising:
obtaining the parameters based on computations of a first neural network, wherein the first neural network is trained based on a; first weight factor applied to a first portion of the parameters corresponding to each of the first set of preset words and a second weight factor applied to a second portion of the parameters corresponding to each of the second set of first words, based on computations of a second neural network distinct from the first neural network.

13. The method of electronic device of claim 12, wherein the second neural network trains the second neural network, using the second neural network, based on the second weight factor exceeded to the first weight factor, such that at least one of the one or more third words is selected based on the plurality of first words.

14. The method of electronic device of claim 12, wherein the second neural network trains the first neural network, based on the first weight factor and the second weight factor adjusted such that at least one of one or more of the third words is selected based on one or more words of the plurality of first words different from the plurality of designated second words.

15. The method of electronic device of claim 12, wherein the first portion of the parameters are a first distribution corresponding to each of the plurality of designated second words among words in the second data set; and
wherein the second portion of the parameters are a second distribution corresponding to each of the plurality of first words among words in the second data set.

16. The method of electronic device of claim 12, wherein the first weight factor and the second weight factor are determined according to whether each of the output one or more third words matches the first words or the set of preset words.

17. The method of electronic device of claim 12, further comprising:

determining at least one of the first weight factor or the second weight factor, so that the summation of the first weight factor and the second weight factor matches a designated numerical value.

18. A non-transitory computer readable medium storing instructions, wherein the instructions, when executed by an electronic device including a memory storing the instructions, and at least one processor operatively coupled to the memory, cause the processor to perform operations comprising:

identifying a request for generating parameters corresponding to respective words including a first set of preset words and a second set of first words; and generating, based on the parameters, the output sentence including second words including at least one word in the first set of preset words and at least one word in the second set of first words.

19. The non-transitory computer readable medium of claim 18, wherein, the memory stores instructions which, when executed by the processor, cause the processor to perform operations further comprising:

obtaining the parameters based on computations of a first neural network, wherein the first neural network is trained based on a first weight factor applied to a first portion of the parameters corresponding to each of the first set of preset words and a second weight factor applied to a second portion of the parameters corresponding to each of the second set of words, based on computations of a second neural network distinct from the first neural network.

20. The non-transitory computer readable medium of claim 19, wherein the memory stores instructions which, when executed by the processor, cause processor to perform operations including:

training, using the second neural network, based on the second weight factor exceeded to the first weight factor, the first neural network such that at least one of the one or more third words is selected based on the plurality of first words.

* * * * *